US005191266A

United States Patent [19]

Futami et al.

[11] Patent Number: 5,191,266

[45] Date of Patent: Mar. 2, 1993

[54] CIRCUIT AND METHOD FOR CONTROLLING LUMINOUS INTENSITY OF DISCHARGE LAMPS

[75] Inventors: Tohru Futami; Masao Sakata; Tsuyoshi Todoriki; Tomio Kusagaya, all of Kanagawa, Japan

[73] Assignee: Nissan Motor Co., Ltd., Kanagawa, Japan

[21] Appl. No.: 480,637

[22] Filed: Feb. 15, 1990

[51] Int. Cl.[5] .......................... H05B 37/02; B60Q 1/04

[52] U.S. Cl. ...................................... 315/307; 315/82; 315/224; 315/308

[58] Field of Search ................. 315/307, 308, 224, 82, 315/171, 172, 176, 175, 209 R, 241 P

[56] References Cited

U.S. PATENT DOCUMENTS

| | | | |
|---|---|---|---|
| 4,276,497 | 6/1981 | Burbeck et al. | 315/209 R |
| 4,362,971 | 12/1982 | Sloan, Jr. | 315/176 |
| 4,525,648 | 1/1985 | De Bijl et al. | 315/224 |
| 4,559,478 | 12/1985 | Fuller et al. | 315/224 |
| 4,585,974 | 4/1986 | Stupp et al. | 315/307 |
| 4,642,525 | 2/1987 | Widmayer | 315/219 |
| 4,761,585 | 8/1988 | Linnman et al. | 315/58 X |
| 4,777,409 | 10/1988 | Tracy et al. | 315/200 R |
| 4,949,012 | 8/1990 | Irick et al. | 315/82 |

FOREIGN PATENT DOCUMENTS 62-198046 9/1987 Japan .

*Primary Examiner*—Eugene R. LaRoche
*Assistant Examiner*—Son Dinh
*Attorney, Agent, or Firm*—Leydig, Voit & Mayer

[57] ABSTRACT

A circuit and method for controlling a discharge lamp without auxiliary lamp(s) are disclosed. The discharge lamp is controlled in a warmed-up arc discharge state when, e.g., power generation of a vehicular alternator is detected. The discharge lamp is transferred from the warmed-up discharge state to an illumination arc discharge state when, e.g., an inner temperature of the discharge lamp has arrived at a predetermined value. The control of warmed-up discharge state is abruptly carried out when, e.g., the internal temperature of the discharge lamp is below the predetermined temperature. A time at which the discharge lamp is to be turned off is controlled according to the internal temperature of the other discharge lamp to be turned on.

28 Claims, 8 Drawing Sheets

CIRCUIT AND METHOD FOR CONTROLLING LUMINOUS INTENSITY OF DISCHARGE LAMPS

BACKGROUND OF THE INVENTION (1) Field of the Invention

The present invention relates generally to a control circuit and method for controlling the luminous intensity of a discharge lamp such as a utilized as head lamp in automotive vehicles.

(2) Background of the Art

A Japanese Patent Application First Publication No. Showa 62-198046 published on Sep. 1, 1987 (which corresponds to U.S. patent application Ser. No. 945,679 and to a British Patent No. 2186957 issued on Feb. 21, 1990) exemplifies a combination vehicle light.

In the previously proposed Japanese Patent Application First Publication, the automotive head lamp includes a pair of dischargeable electrodes and a discharge lamp having a substance which vaporizes and emits the light during its discharge. The, the discharge lamp is installed within a lamp housing. An optical lens is installed on a front face of the lamp housing and a reflector is installed on a rear inner surface thereof, respectively. The discharge lamp is charged when the metallic vapor of the light emitting substance is excited at a high energy state, and, when it is again returned into a low energy state the lamp is caused to illuminate.

However, in order to stabilize the luminous intensity an automotive vehicle head lamp, it is necessary to sufficiently vaporize the molecules of a luminous metal. The degree of vaporization of the luminous metal is dependent on the temperature within the discharge lamp. Therefore, if a light switch is operated when a cold state exists within the discharge lamp, it takes time to reach a prescribed luminous intensity.

Hence, in transient cases where the head lamp is illuminated while the vehicle enters a tunnel in day time, or the head lamp is illuminated after being turned off for a while during night time, or beam switching illumination is carried out and the head lamp is illuminated at alternating intensities, the prescribed intensity value cannot speedily be obtained at the moment a lighting operation is required.

To get around this problem head lamp structures have been proposed in which an incandescent or halogen lamp is used together with the discharge lamp and until the discharge lamp arrives at the prescribed luminous intensity value, the incandescent lamp or halogen lamp is illuminated as an auxiliary lighting means.

However, in such a system, since both the discharge lamp and the incandescent or halogen lamp cannot be installed within the same lamp housing it is necessary to contrive a special structure for supporting two types of lamps. Therefore, the construction of the head lamp becomes complex and expensive.

SUMMARY OF THE INVENTION

It is, therefore, an object of the present invention to provide a control apparatus and method for a discharge lamp which carries out speedy illumination without the necessity of installing an auxiliary lamp and which does not incur a temporary insufficiency of luminous intensity when switching is carried out.

The above-described object can be achieved by a circuit for controlling a discharge lamp, comprising a) a first circuit responsive to a first input signal for charging and illuminating the discharge lamp and b) a second circuit responsive to a second input signal for outputting the first signal to the first circuit to cause the first circuit to control the discharge lamp at least between a stand-by warmed-up arc discharge state via a minute current flowing through the discharge lamp and full-illumination arc discharge state via a a full-illumination current flowing through the discharge lamp.

The above-described object can also be achieved by a circuit for controlling a discharge lamp comprising a) first means for variably setting an oscillation frequency of a DC/AC converter so as to control a discharge state of the discharge lamp; and b) second means for detecting an internal temperature within the discharge lamp, and for causing the first means to variably set the oscillation frequency of the DC/AC converter according to the inner temperature of the discharge lamp so that speedy full-illumination of the discharge lamp can be achieved.

The above-described object can also be achieved by a method for controlling a discharge lamp comprising the steps of a) receiving a first signal and discharging and illuminating the discharge lamp and b) receiving a second signal and, responsive to the second signal, controlling the discharge lamp at least between a warmed-up arc discharge state via a minute current flowing in response the first signal, and, full-illumination arc discharge state due to a full-illumination current following in response to the first signal.

The above-described object can also be achieved by a method for controlling a discharge lamp comprising the steps of a) variably setting an oscillation frequency of a DC/AC converter connected to a discharge lamp so as to control a discharge state of the discharge lamp and b) detecting an internal temperature within the discharge lamp and producing a first signal to variably set the oscillation frequency of the DC/AC converter according to the inner temperature of the discharge lamp so that speedy illumination of the discharge lamp can be achieved.

DETAILED DESCRIPTION OF THE PREFERRED EMBODIMENTS

Reference will hereinafter be made to the drawings in order to facilitate a better understanding of the present invention.

Figure 1:
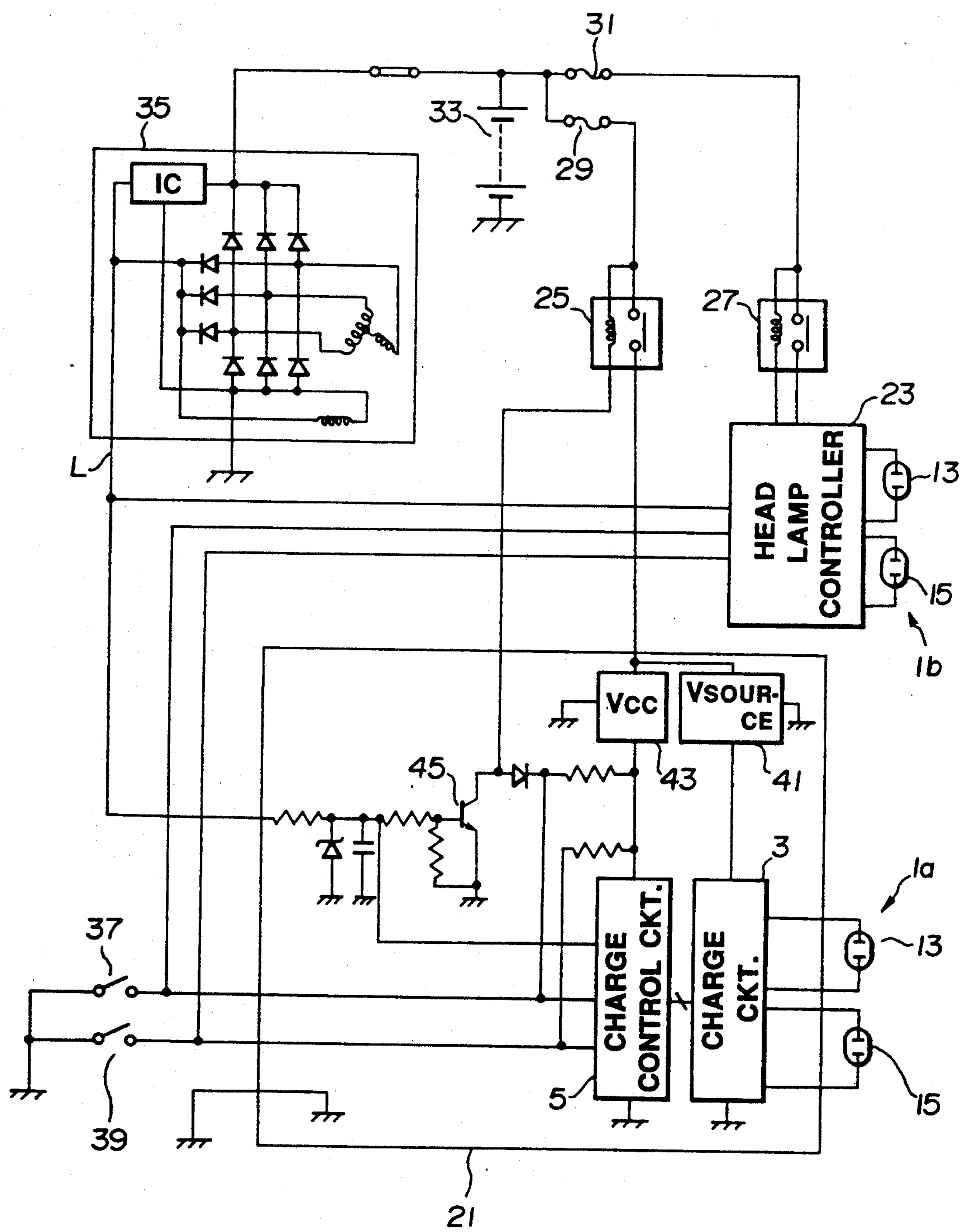
FIG. 1 is a circuit block diagram of the discharge lamp controlling circuit of the preferred embodiment according to the present invention.

FIG. 1 shows the structure of a control circuit controlling discharge lamps in a preferred embodiment according to the present invention.

The control circuit for the discharge lamps is applicable to head lamps for an automotive vehicle. Discharge lamp 1 is constituted by a left discharge lamp 1*a* and a right discharge lamp 1*b*, each discharge lamp 1 including a main discharge lamp 13 and a dimmer discharge lamp 15. Although the circuit and method of the invention may be put to a wide variety of applications, for purposes of automotive head lamps, the main discharge lamp may be said to correspond substantially to an automobile's high-beam head lamp, the dimmer discharge lamp corresponding substantially to an automobile's low-beam head lamp.

The left discharge lamp 1*a* is controlled by means of a left head lamp controlling circuit 21. The right discharge lamp 1*b* is controlled by means of a right head lamp control circuit 23.

In addition, head lamp relays 25, 27 are respectively installed upstream of the left head lamp control circuit 21 and the right head lamp control circuit 23 for carrying out connection and disconnection of the power supply. These head lamp relays 25, 27 are connected to a battery 33 and the alternator 35 which serve as a power supply via power supply fuses 29, 31. A light switch 37 and beam change-over switch 39 are connected to the head lamp controlling circuits 21, and 23.

When the light switch 37 is in the switched-on to charge and illuminate discharge lamps 1*a* and 1*b*, operation of the beam change-over switch 39 causes switching between a main discharge lamp 13 and a dimmer discharge lamp 15. Hence, in the preferred embodiment, the left head lamp control circuit 21 and right head lamp control circuit 23 constitute a control circuit which can charge and illuminate the main discharge lamp(s) 13 or the dimmer discharge lamp(s) 15.

Since the left head lamp control circuit 21 and right head lamp control circuit 23 have mutually the same structures, further detailed explanation will be limited to the left (side) head lamp control circuit 21.

The left (side) head lamp control circuit 21 is provided with a charge circuit 3 and charge control circuit 5.

The charge circuit 3 serves to charge and illuminate the main and dimmer discharge lamps 13 and 15.

The charge control circuit 5 serves to control the charge circuit 3 so that the discharge lamps 13 and 15 are controlled at least between a stand-by warmed-up arc discharge state via a small stand-by current and a lighting arc discharge state via a full-illumination current. It is noted that both charge circuit 3 and charge control circuit 5 are connected to a relay contact of the left head lamp relay 25 via the power supply portions 41 and 43, respectively.

The left (side) head lamp control circuit 21 receives command signals derived from the light switch 37 and beam change-over switch 39.

The light switch 37 is connected to an excitation coil of the left head lamp relay 25.

Furthermore, the left head lamp control circuit 21 is provided with a relay control transistor 45, its collector terminal being connected to the energization coil of the left head lamp relay 25. In addition, a base terminal of the relay control transistor 45 is connected to an L terminal of an alternator 35. The L terminal of the alternator 35 provides the vehicle power supply voltage when the engine of the vehicle is rotated and the alternator 35 starts power supply generation. When current flows through the relay controlling transistor 45 due to the power supply voltage, the transistor 45 is in the conduction state so that the relay 25 is turned to ON.

An output of the L terminal of the alternator 35 is serially input to the charge control circuit 5. Hence, since the charge control circuit 5 can detect the output of the alternator 35, the charge control circuit 5 also constitutes a start detecting means for detecting engine start.

Figure 2:
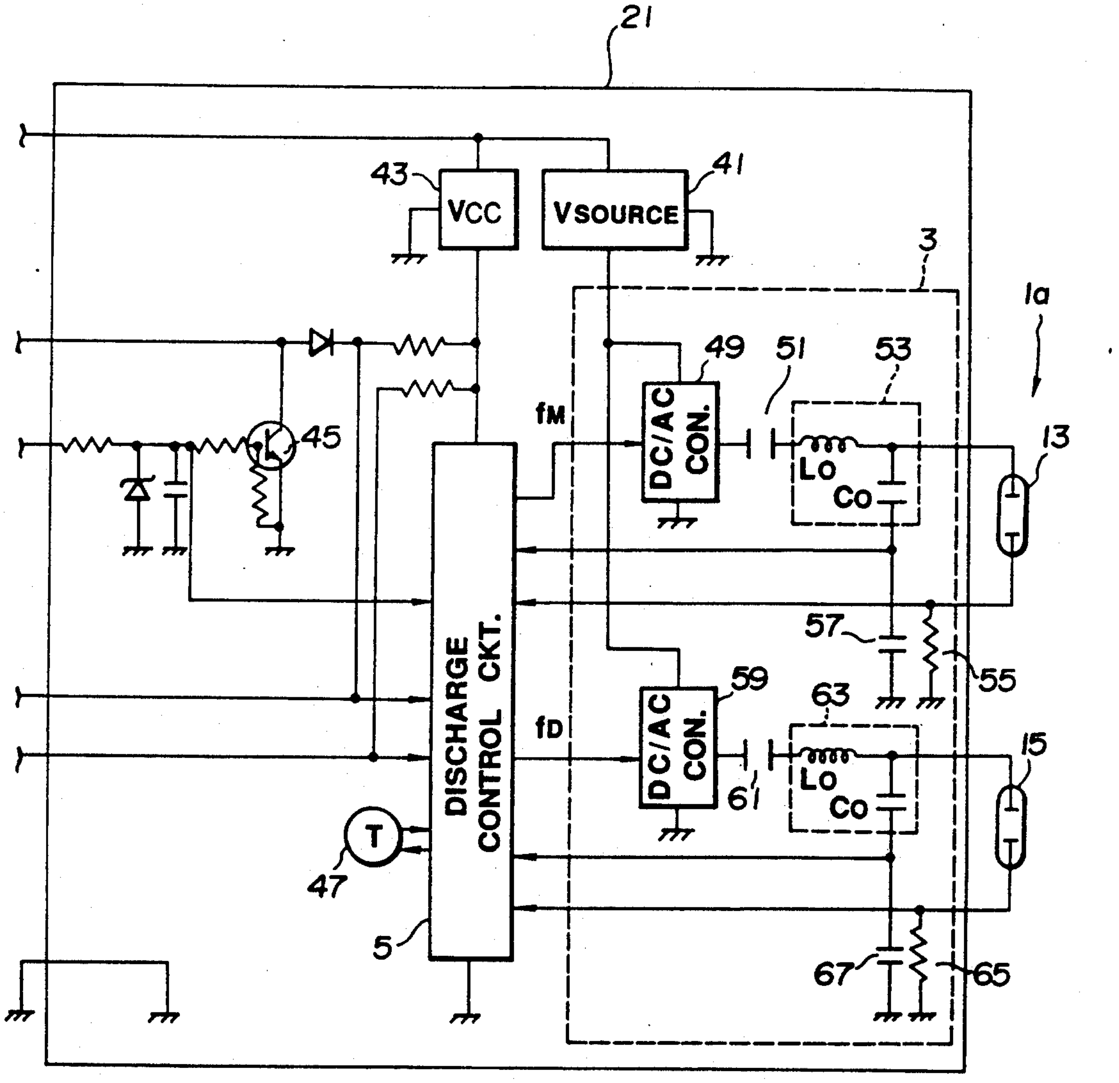
FIG. 2 is an enlarged view of essential parts indicating the details of a discharge circuit denoted by the numeral 21 in FIG. 1.

FIG. 2 shows detailed circuit construction of the left head lamp control circuit 21.

The charge control circuit 5 receives the input signal of a timer 47. When lighting is changed between the two discharge lamps 13, 15, the timer 47 sets a time and the charge control circuit 5 controls the turn-off timing of the illuminated discharge lamp which has been turned off, according to the temperature within the discharge lamp which has been turned on.

In other words, the internal temperature in the discharge lamp selected to be illuminated can delay the turn-off timing of the discharge lamp previously selected; thus, the temporary overlap of both beams prevents a temporary reduction of luminous intensity during beam switching.

Hence, the timer 47 and charge control circuit 5 constitute switching control means in the preferred embodiment.

An example of the structure of the charge circuit 3 is shown detail in FIG. 2.

The main discharge lamp 13 is connected to a section of the charge current 3 which includes a main beam DC/AC converter 49, a main beam coupling capacitor 51, a main beam L-C resonance circuit 53, a main beam current detecting resistor 55, and a main beam voltage detection capacitor 57.

In addition, the dimmer discharge lamp 15 is connected to a section of the charge circuit 3 which includes a dimmer beam DC/AC converter 59, dimmer beam coupling capacitor 61, dimmer beam L-C resonance circuit 67, a dimmer beam current detecting resistor 65, and dimmer beam voltage detecting capacitor 63.

Both main beam DC/AC converter 49 and dimmer beam DC/AC converter 59 receive a signal having a set frequency from the charge control circuit 5. The L-C resonance circuits 53, 63 include an inductor Lo, electrostatic capacitor Co, the voltage detecting capacitor 67 having its capacitance sufficiently larger than that of Co (for example, 100 through 1000 times).

The detection voltage and detection current of the discharge lamps 13, 15 are input to the charge control circuit 5. The detection current has a constant relationship to the tube temperature of the discharge lamps 13, 15.

The current detection resistors 55, 65 and charge control circuit 5 constitute temperature detecting means in the preferred embodiment.

Next, an action of the discharge lamp control circuitry will be described.

Since both left and right discharge lamps 1*a*, 1*b* have mutually the same operations, the operation of the left discharge lamp 1*a* will only be described.

(a) Power Supply

The power supply to the left head lamp control circuit 21 is carried out by the start of power generation in the alternator 35 or operation of the light switch 37.

That is to say, when the vehicular engine is running and the alternator 35 starts power generation, the L terminal provides the vehicular power supply voltage and a relay control transistor 45 incorporated in the left head lamp control circuit 21 is operated. Consequently, the current flows through an excitation coil of the left head lamp relay 25 so that the vehicular power supply voltage is supplied to the power supply portions 41, 43 of the left head lamp control circuit 21.

When the light switch 37 is turned ON, current flows through the excitation coil of the left head lamp relay 25 from the battery 33. The vehicular power supply voltage is then supplied to the power supply portions 41, 43, respectively.

Hence, at the same time as engine start, the discharge lamps 13, 15 are put in a stand-by state so that speedy illumination control can be carried out.

When the engine is stopped, the head lamp relays 25, 27 are turned OFF. With the fact that no operation of the light switch 37 commonly takes place when the engine is not operated taken into consideration, voltage is not applied to the circuit.

(b) Basic Operation of the Charge Control

Since the basic operation of the charge control is the same for both the main discharge lamp 13 and the dimmer discharge lamp 15, charge control operation will be explained in terms of the main discharge lamp 13.

The charge control circuit 5 serves to set a conversion frequency $f_M$ of the main beam DC/AC converter 49. In this way, a voltage Vsource having a frequency of $F_M$ is supplied to the main beam L-C resonance circuit 53 via a main beam coupling capacitor 51.

Figure 3:
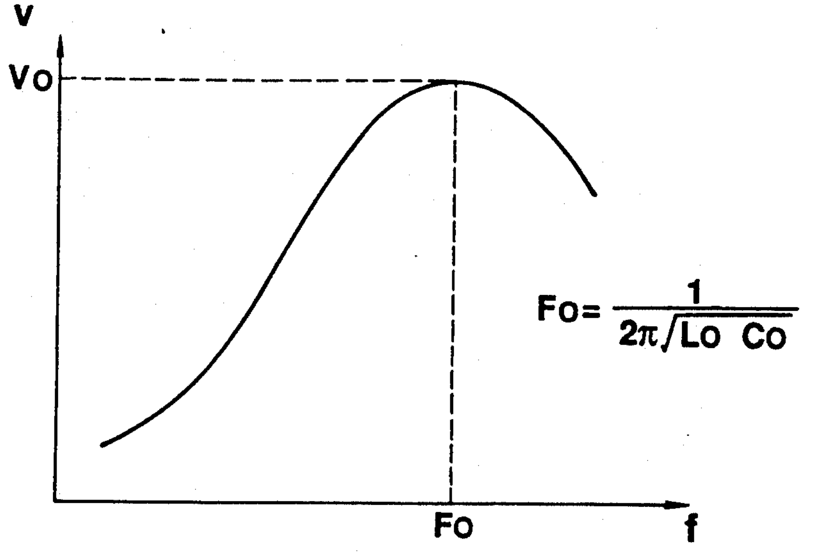
FIG. 3 is the characteristic graph of a voltage-to-frequency relationship for a resonance circuit.

The L-C resonance circuit 53 has a resonance frequency as shown in FIG. 3.

$$F_o = 1/2 \sqrt{L_o \cdot C_o}$$

Hence, when the charge control circuit 5 is set as $f_M = F_o$, both ends of a capacitor Co of the L-C resonance circuit 53 generate a very high voltage Vo determined with internal resistances of the Lo and Co (for example, 5 kV through 20 kV).

On the other hand, although an insulating breakdown voltage of the main discharge lamp 13 changes due to its internal pressure, the breakdown voltage becomes lower than Vo. In addition, in a case where the main discharge lamp 13 is in an insulated condition, both terminal voltages of the discharge lamp 13 are substantially equal to the terminal voltage across a capacitor Co of the resonance circuit 53.

Hence, when $f_M = Fo$, the insulating breakdown of the main discharge lamp 13 immediately occurs and, thereafter, a spark discharge occurs.

Since there is a complete breakdown of resistance inside of the main discharge lamp 13, an instantaneous short circuit occurs.

So, although the terminal voltage across the discharge lamp 13 is abruptly reduced, it is simultaneously, transformed into an arc discharge in which hot electrons are self oscillated from the cathode.

When the arc discharge is started, the charge control circuit 5 controls the inter-terminal voltage and charge current by controlling $f_M$.

When the temperature within the discharge lamp 13 is raised, the resistance in the charge path is increased when the metal is sufficiently vaporized.

Figure 4:
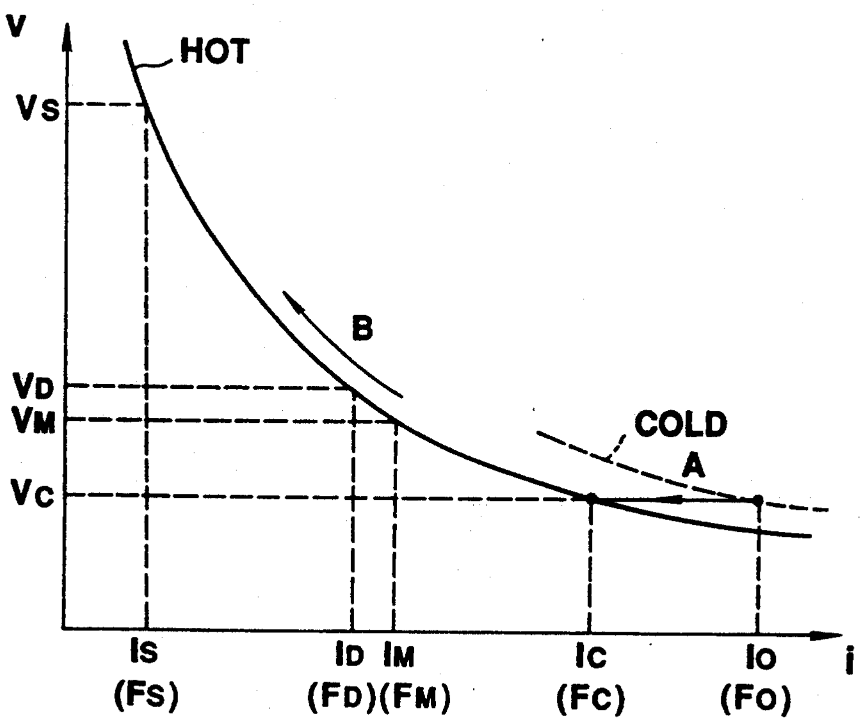
FIG. 4 is a characteristic graph of an arc voltage-to-current relationship after discharge operation.

As shown by path A of FIG. 4, the current value is settled at a predetermined value Ic.

In addition, since the arc discharge has a negative characteristic expressed in the following:

$V = K_1 + K_2/I$ (Ayrton equation), the arc discharge current becomes reduced as shown in the path B of FIG. 4.

The light emitting quantity of the discharge lamp 13 is dependent on the current. As the current is reduced, the luminous intensity of the discharge lamp 13 becomes reduced.

Next, the operation of the charge control circuitry in the preferred embodiment will be described with reference to the relevant operational flowchart.

(c) Initial Charge Control And Stand-By Control At the Time Of Engine Start

When the driver starts the engine, the alternator 35 starts power generation so that the L terminal provides the vehicular power supply voltage. Thus, the relay control transistor 45 is turned ON and the relay 25 is operated. The power is supplied to the charge control circuit 5 and the control is started in accordance with a previously determined program.

Figure 5:
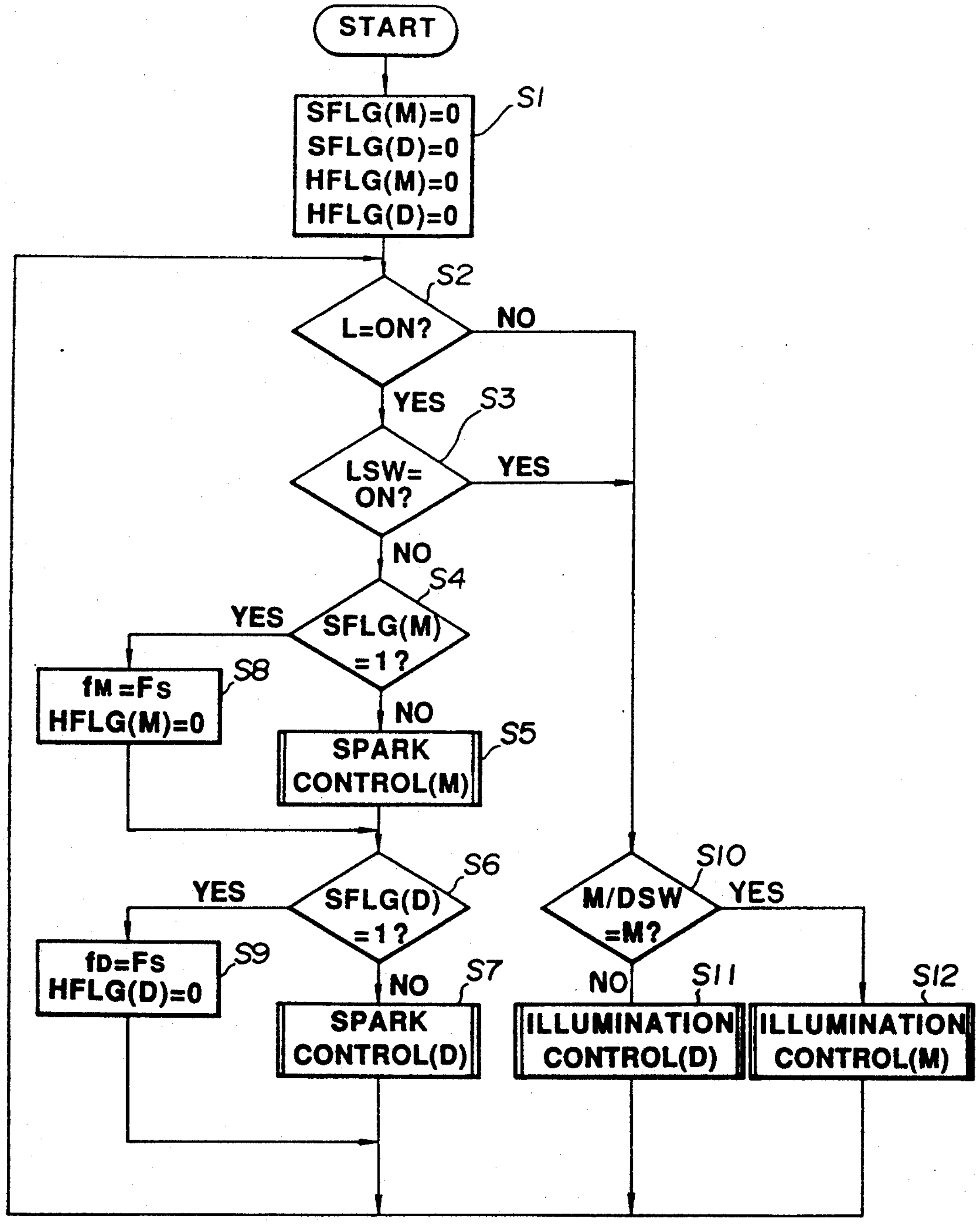
FIG. 5 is an operational flowchart for explaining control of the discharge lamp.

With reference to FIG. 5 of the drawings, in step S1, a main spark discharge completion flag SFLG (M), a dimmer spark discharge completion flag SLFG (D), a main warmed-up completion flag HLFG (M), and a dimmer warmed-up completion flag HFLG (D) are cleared to zero (=0).

Next, in step S2, the microcomputer determines whether the L terminal input of the alternator 35 is at a high level (L=ON). In this case, since the alternator 35 starts power generation when the engine starts, the control circuit determines whether the light switch 37 is turned ON or OFF (in step S3, LSW=ON ?).

When the light switch 37 is turned OFF in daytime, the control circuit determines whether the main spark discharge completion flag SFLG (M) equals 1 (=1) in step S4.

In this case, since the main spark discharge completion flag is cleared in step S1 (SFLG (M)=0), the control circuit determines that spark discharge is not completed and a spark control (M) is executed in step S5.

Figure 8:
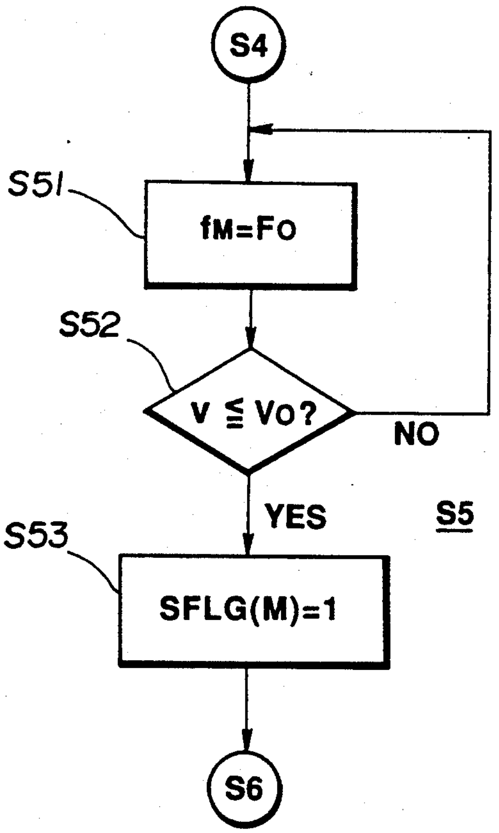
FIG. 8 is an operational flowchart for explaining a main spark discharge control of the main discharge lamp.

The main spark control of step S5 is executed as shown in FIG. 8 in steps S51–S53.

As shown in FIG. 3, the oscillation frequency $f_M$ of the main beam DC/AC converter 49 is set to a high value $f_M = F_o$ and simultaneously the voltage across the main beam voltage detecting capacitor 57 is read. Then, the spark discharge is started and the complete breakdown across the electrodes of the main discharge lamp 13 occurs. Thereafter, the voltage is abruptly reduced. This previously determined voltage value Vo is used to determine the abrupt reduction described above in step S52 of FIG. 8. Therefore, the control circuit turns to 1 the main spark discharge completion flag SFLG (M) in step S53.

Figure 9:
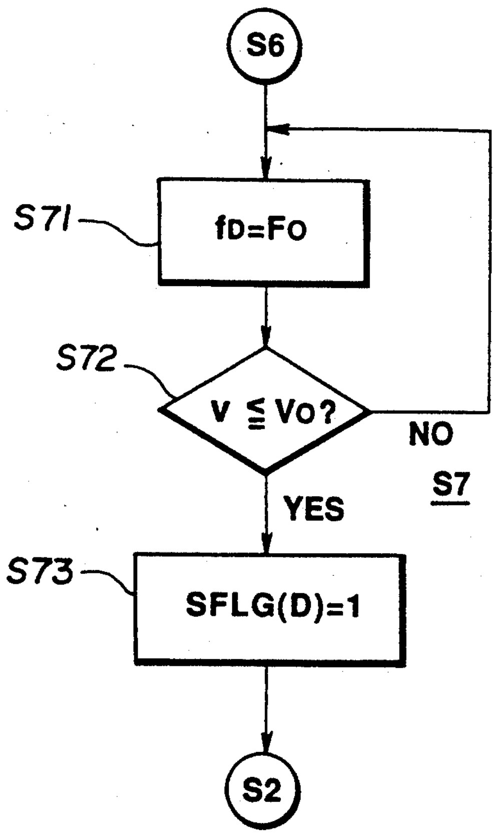
FIG. 9 is an operational flowchart explaining a spark discharge control for the dimmer discharge lamp.

Next, the dimmer spark discharge completion flag SFLG (D) is also set to "1" (SFLG (D)=1) in steps S6 and S7 of FIG. 5, i.e., steps S71, S72 and step S73 of FIG. 9.

Since the main spark discharge completion flag is already set as SFLG (M)=1 before again passing steps S2 and S3, the routine passes through step S4 as YES. In step S8, a low frequency $f_M=F_s$ (≦Fo) is set as a stand-by frequency as shown in FIG. 4.

When $f_m=F_s$, the main beam L-C resonance circuit 53 is used to control the terminal voltage across the main discharge lamp 13 to maintain it at a relatively high voltage level (for example, 500 V to 1 kV). Therefore, the arc current is very small (for example, 0.1 A or less). Then, since this minute arc current gradually warms up the inside of the tube of the main discharge lamp 13, the luminous metal is vaporized. After several minutes have passed, the arc current and arc voltage are settled at the terminal voltage Vs and current Is as shown in FIG. 4.

When $f_M=F_s$, the main warm up completion flag HFLG (M) is cleared (=0) in order to control the illumination as will be described later.

The dimmer discharge lamp 15 is warmed up and in the stand-by state in step S9 via step S6 so that the warm up using minute current is carried out in step S9 via step S6. The dimmer discharge lamp is held in the stand-by state.

In this way, a minute arc current causes both main discharge lamp 13 and dimmer discharge lamp 15 to be maintained warmed up in a stand-by state at the same time as the engine is started. Hence, in the turning on control to be described later, time lags are not present for the warming up of the discharge lamps 13, 15. Speedy illumination can be carried out and response characteristics are greatly improved.

Therefore, in cases of daytime head lamp illumination requirements, such as when a vehicle enters a tunnel during daytime driving or when a vehicle momentarily requires headlamp illumination for other reasons, or in a situation during night driving when the vehicle head lamps are temporarily turned off for some reason, full illumination of the head lamps can be speedily resumed. Illumination control as will be described later is carried out in the arc discharge state due to the presence of a minute current, the spark discharge control carrying out spark discharge need not be repeated. Therefore circuit deterioration due to repetition of such operation can be prevented and long term use can be assured.

Furthermore, since the engine is started by means of the output of the L terminal of the alternator 35, the discharge lamps are quickly placed in the stand-by state soon after the engine is started.

It is noted that although in the stand-by state a slight amount of illumination is present, it represents a very small quantity of light, such as a parking lamp of a vehicle body or less, so that dazzling of oncoming vehicle drivers is not a problem.

(d) Illumination Control

In step S3 of FIG. 5, when the light (illumination) switch 37 is operated in the stand-by state, LSW is ON and the routine goes to step S10.

In step S10, the control circuit determines whether a beam change-over switch 39 is in the main discharge lamp state (switch OFF) or in the dimmer discharge lamp state (switch ON). If the main discharge lamp state (OFF) is selected, M/DSW=M so that control is transferred to the illumination control (M) in step S12.

Figure 6:
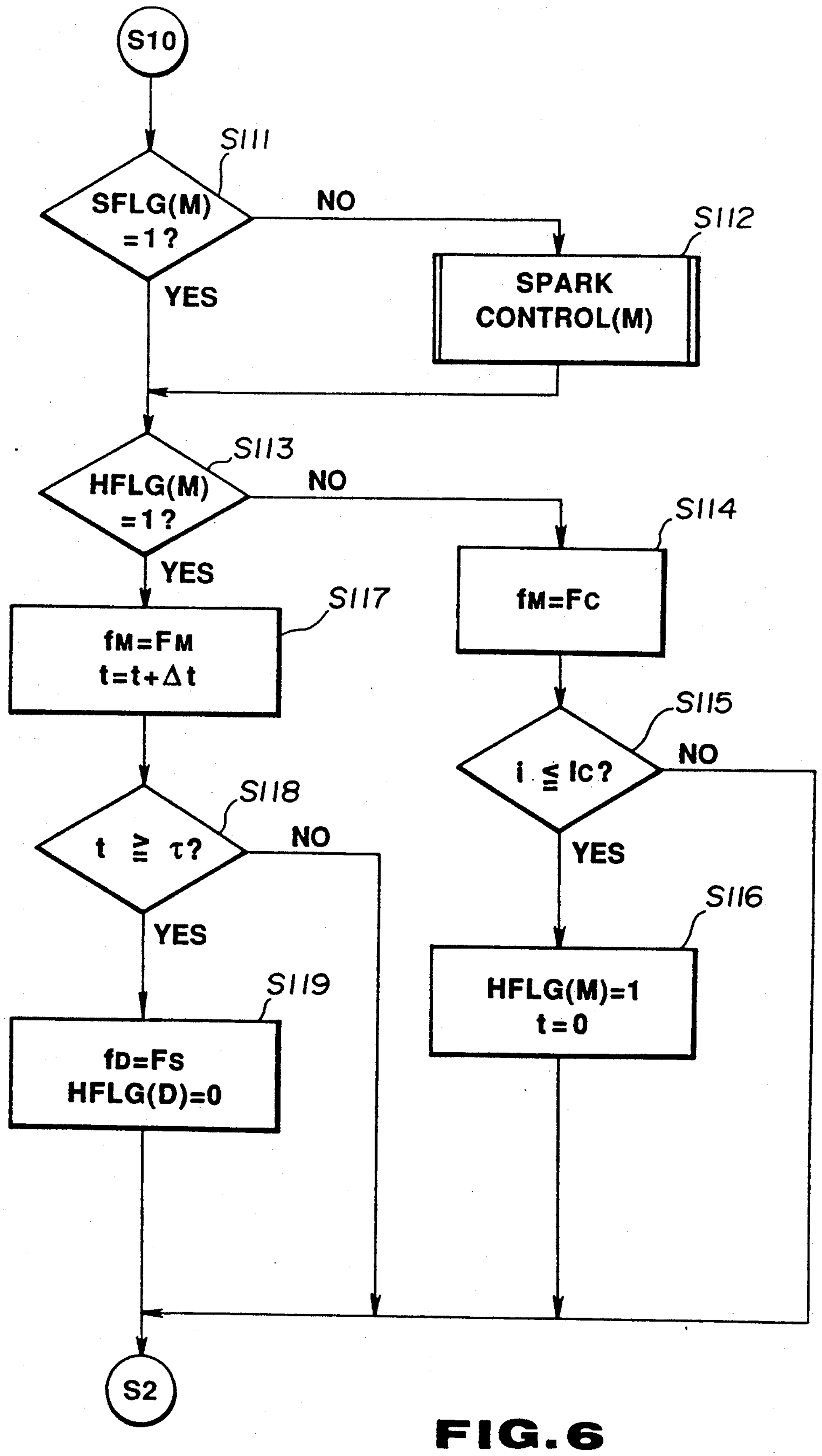
FIG. 6 is an operational flowchart for explaining a main head lamp illumination control.

In step S12, illumination control for the main discharge lamp 13 is executed in the routine shown in FIG. 6.

First, the control circuit determines the status of the main spark discharge completion flag SFLG (M)=1 in step S111. Since the park discharge is already completed, SFLG (M)=1 the answer will be yes in step S111.

It is noted that in a case when the light switch 37 is operated before the engine is started, the routine passes steps S1 and S2 of FIG. 5 and goes immediately to step S10. Therefore, the main spark discharge is not completed (No in step S111). At this time, the routine shown in FIG. 8 is executed in step S112 in order to carry out the spark control (D).

Next, since the main warm-up completion flag HFLG (M) is cleared, the routine goes from step S113 to step S114. Thus, the frequency $F_M=F_C$ is set when the inside of the discharge lamps is cooled. In a case where $f_M=F_C$ is set, the voltage and current are applied and are caused to flow through path A as shown in FIG. 4.

Another case is where the stand-by time is short and warm-up of the main discharge lamp 13 is insufficient, e.g., the light switch 37 is operated immediately after the engine has started.

Figure 10A:
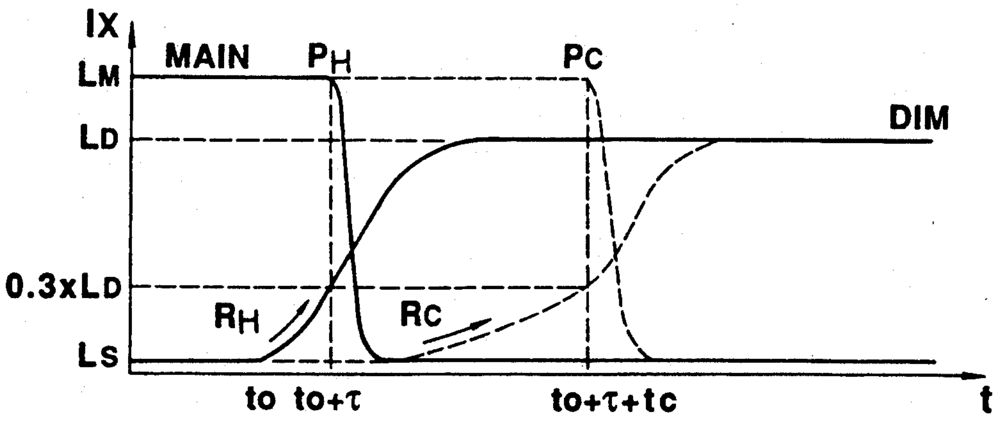
FIG. 10 is a timing chart for explaining a switching between main/dimmer discharge modes.
Figure 10B:
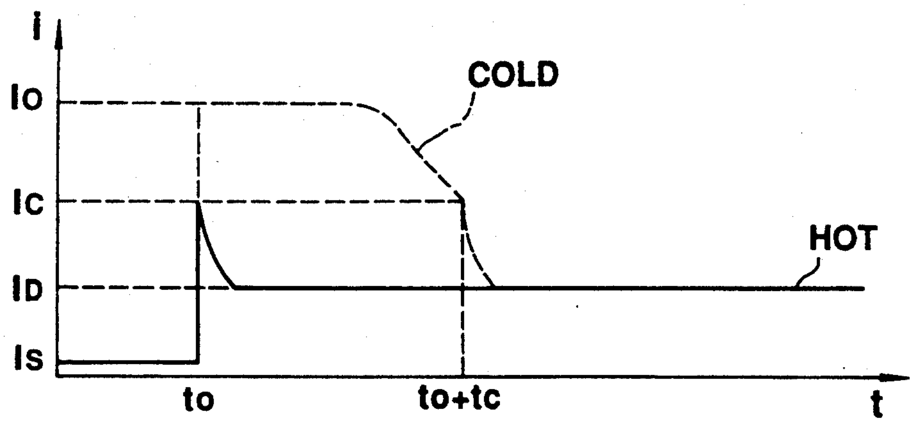
Figure 10C:
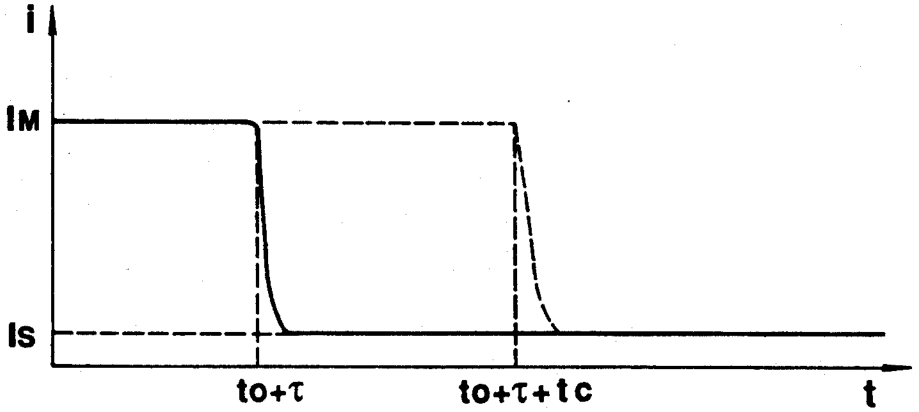

As shown in a broken line of FIG. 10(*b*), an initial fast warm-up current $I_o$ (≧$I_c$) has a relatively large magnitude. This current $I_o$ is very large (for example, 2 A to 3 A) and therefore the tube temperature is abruptly increased so that the vaporization of the luminous metal is promoted.

As the vaporization of the metal is promoted, resistance between terminals across the main discharge lamp 13 is increased and simultaneously the current is decreased.

A speedy warm-up control is caused to provide a stable fast warm-up current value $I_C$ as shown in FIG. 4.

In steps S115 and S116, the main warm up completion flag HFLG (M)=1 since i≦$I_c$.

After HFLG (M)=1, the routine passes step S113 and goes to step S117. If $f_M=F_M$ is set, the current $I_M$ (for example, 0.3 A through 0.6 A) flows through the main discharge lamp 13 and the inter-terminal voltage $V_M$ (for example, 50 V through 100 V) is applied to the main discharge lamp 13.

At this time, since the inside of the main discharge lamp is already in the warm-up condition, a large amount of power consumed at the terminals is used for the light emission so that a stable and large light quantity can be achieved.

On the other hand, in a case where the stand-by state is long and warm up in the inner portion of the lamp tube is sufficient, i≧$I_C$ as shown in a solid line of FIG. 10(*b*) and main warm up completion flag HFLG (M) equals one (=1) in steps S115 and S116. In this case, since the light switch 37 is operated and immediately thereafter $f_M=F_M$ is set, stable light quantity can speedily be achieved.

The control circuit determines whether the temperature of the main discharge lamp 13 becomes a predetermined temperature according to the current flowing through the main discharge lamp 13 in step S115.

If the temperature described above indicates the predetermined temperature, the illumination control is immediately carried out. Therefore, response is extremely fast. In addition, since the tube temperature is determined according to the current value, no special temperature sensor is needed and the structure of the system is simplified.

A timer 47 is reset in step S116 (t=0).

In step S117, the timer 47 is incremented as (t=t+Δt). The control circuit determines whether the time exceeds the set time ö in step S118. The illumination control is repeated in step S11 via the steps S3 and S10 if the time does not exceed the set time ö in the above determination. If the time exceeds the set time ö, the discharge control circuit 5 sets the conversion frequency $f_d = F_S$ of the dimmer beam DC/AC converter 59 and the dimmer warm up completion flag is cleared (HFLG (D)=0). In this case, the contents of step S11 are again executed via steps S2, S3, and S10. As the illumination of the main discharge lamp 13 is carried out, the dimmer discharge lamp 15 is controlled in the stand-by state.

(e) Main/Dimmer Switching Control

Figure 7:
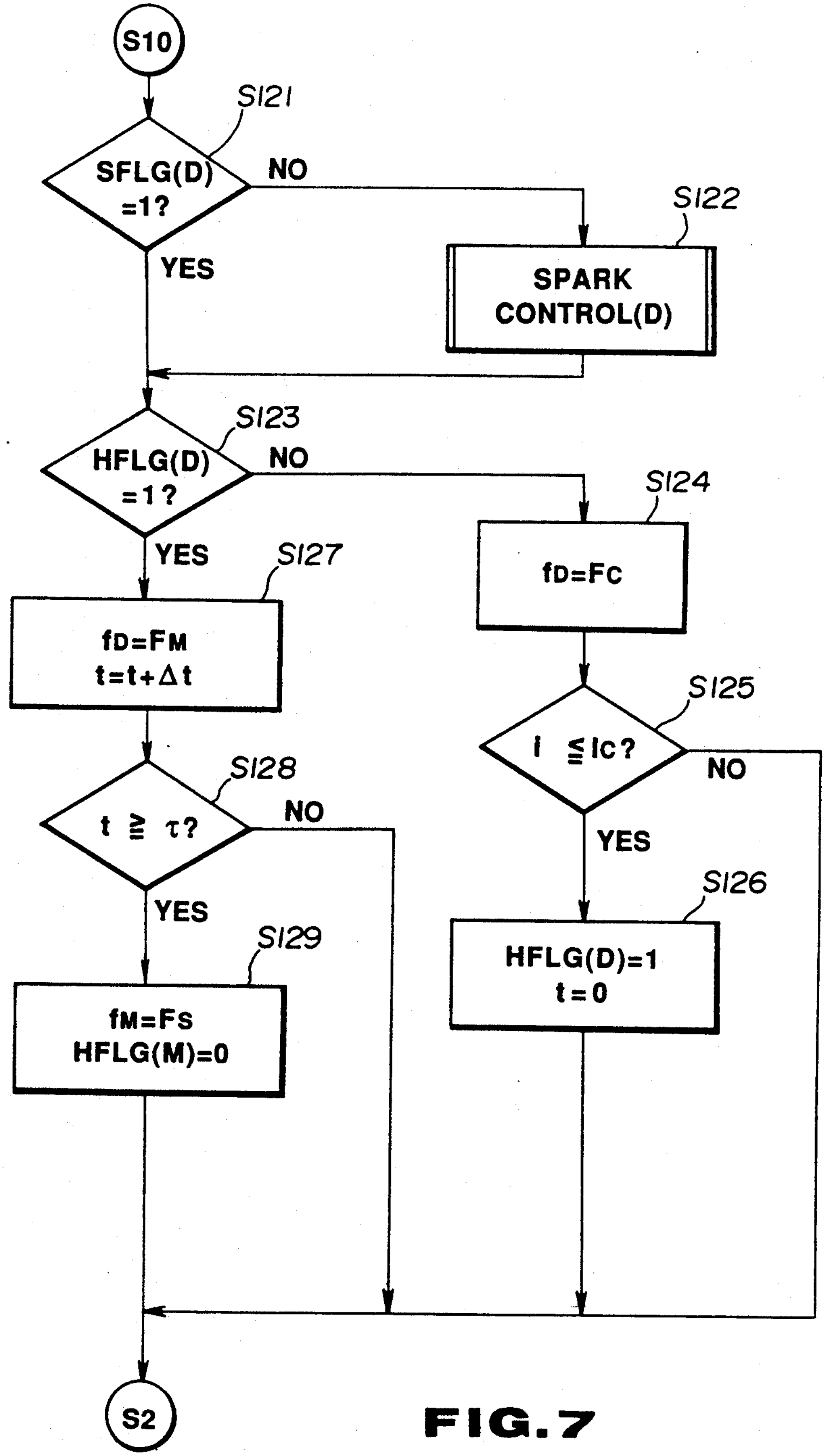
FIG. 7 is an operational flowchart for explaining an illumination control for a dimmer discharge lamp.

Next, when the beam changeover switch 39 is turned to ON, thus changing to the dimmer discharge lamp, the routine goes from step S10 to the step S11 in which the illumination control routine of the dimmer discharge lamp 15 shown in FIG. 7 is executed in the same way as the illumination control routine of the main discharge lamp 13 shown in FIG. 6 (steps S121 through S129). Upon completion of tube warm-up for the dimmer discharge lamp 15, the flag HFLG (D)=1. Then, when $f_d = F_D$ is set, the voltage of $V_D$ and the full-illumination current of $I_D$ shown in FIG. 4 are achieved. Hence, the dimmer discharge lamp 15 can also be speedily illuminated.

It is noted that the main discharge lamp 13 is extinguished after the set time ö (for example, 0.2 to 1 seconds) upon completion of the warm-up of the dimmer discharge lamp 15. That is to say, at the same time as the dimmer warm up completion flag HFLG (D)=1 in the step S126, the timer 47 is reset (t=0). In step S127, the timer 47 is counted up (t=t+Δt).

When the time-up count value t exceeds the set time ö in step S128 ($t \geqq \tau$) in step S128, the main discharge lamp 13 is in the stand-by state with the conversion frequency $f_M = F_S$. The main warm up completion flag HFLG (M)=0.

Such operations as described above will furthermore be explained with reference to FIG. 10(*a*) through FIG. 10(*c*). In cases where the stand-by state of the dimmer discharge lamp 15 takes a long time and beam switchover is carried out in a state in which the inner tube is warmed up, the characteristic is shown by a solid line of FIG. 10(*c*).

That is to say, when the beam switchover is carried out at the time of $t = T_O$, the luminous intensity is speedily increased as compared with the light quantity $L_S$ at the time of the stand-by state.

Thus, the full-illumination light quantity $L_D$ is reached along path $R_H$ of FIG. 10(*c*). On the other hand, the main discharge lamp 13 causes the current to be immediately reduced at $t = t_o + \tau$ after the set time τ, as shown in FIG. 10(*c*). Consequently, the main discharge lamp 13 indicates a stand-by current $I_S$.

At this time, although the light quantity of the main discharge lamp 13 is also abruptly reduced, the luminous quantity of the dimmer discharge lamp 15 already reaches $0.3 \times L_D$ at the time of $t = t_o + \tau$.

Consequently, the light quantity cannot temporarily be lost during beam exchange.

Next, in a case where the warm up of the dimmer discharge lamp 15 is insufficient, the light quantity and current of the dimmer discharge lamp are indicated as broken lines of FIGS. 10(*a*) through 10(*c*).

In detail, the time at which the main discharge lamp 13 is turned off is delayed by a time $T_c$ required for the warming up the dimmer discharge lamp 15 and is $t = t_o + t_c + \tau$.

In a case where the main discharge lamp 13 is turned off in the same way as upon completion of the warm up of the dimmer discharge lamp 15, the light quantity is abruptly reduced at an interval of $P_H - P_C$ of FIG. 10(*a*). However, as described above, in a case where the warm up of the dimmer discharge lamp 15 is insufficient and the dimmer discharge lamp 15 reaches the full-illumination light quantity $L_D$ along path $R_c$ of FIG. 10(*a*), the time at which the main discharge lamp 13 is turned off is carried out at the time $t = t_o + t_c + \tau$.

At this time, the light quantity of the dimmer discharge lamp 15 already reaches $0.3 \times L_D$. In the same way, while the beams are switched, no temporary loss of light intensity occurs.

It is noted that the addition of time $T_c$ required for the warm up of the dimmer discharge is carried out by maintaining the dimmer warm up completion flag HFLG (D)=0 until the current of the dimmer discharge lamp 15 is $i \leqq I_c$.

In this way, a time at which either of the discharge lamps 15, 13 to be turned off is controlled according to the corresponding temperature of the discharge tubes 13, 15 to be illuminated during the turning on of the illumination (provided that the inner tube temperature is determined according to the value of the current). A temporary loss of light quantity during beam changing is thus avoided.

The present invention can be applied to discharge lamps of a two-wheeled cycle or a marine vessel.

As described hereinabove, since the present invention can control the discharge lamps in the warm up arc discharge state when the engine is started, the discharge lamps are speedily illuminated with good response characteristics in the illumination arc discharge state. In addition, since the arc discharge state is maintained upon the engine start, the spark control is not repeated whenever the lamp is turned on. Therefore, deterioration can be prevented and the long term use can be achieved.

In a case where engine start is detected according to the output of the alternator, the control circuit can make the discharge lamps stand by without failure when the engine is started.

Thus, energy saving can be achieved and turning off is eliminated due to the voltage drop occurring when the starter is turned OFF.

The transfer from the stand-by warm-up arc discharge state to the full-illumination arc discharge state is controlled according to the temperature within the discharge lamps. If the temperature in the discharge lamp is warm, the control is immediately transferred to the arc discharge state. Thus, no wasted time is present after warm up and response characteristics are maintained extremely high.

When the detected temperature is below the predetermined temperature, the control for warm up can speedily be carried out. Wasted time until warm up is achieved is descreased and response characteristics are considerably increased.

Furthermore, in a case when the temperature in the discharge lamp is determined according to the current value, no special sensor is needed and the structure becomes simple.

In a case where the head lamp relay is installed upstream of the discharge circuit and discharge control circuit, the head lamp relay is turned to ON at the same time as engine start and the lamp soon achieves the stand-by state. In addition, when the engine is stopped, no voltage is applied to the circuitry, thus no errosion can occur.

Since during switching between the main discharge lamp and dimmer discharge lamp, the time at which one of the discharge lamps is to be turned off is controlled according to the tube temperature in the other discharge lamp to be turned on, the turning-off of the discharge lamp to be turned off can be carried out after the internal temperature of the discharge lamp to be turned on is sufficiently warmed up. Thus, temporary loss of light quantity can be prevented.

It will fully be appreciated by those skilled in the art that the above description has been made in terms of the preferred embodiments and various changes and modifications can be made without departing from the scope of the present invention which is to be defined by the appended claims.

What is claimed is:

1. A control circuit for a discharge lamp comprising:
current control means for controlling a current flowing through a metal vapor discharge lamp;
start detecting means for generating a first input signal in response to detection of starting of an engine; and
discharge control means for switching the current control means in response to the first input signal from an off state in which no current flows through the discharge lamp to a stand-by state in which a stand-by current producing a stand-by warmed-up arc discharge state controllably flows through the discharge lamp, and for switching the current control means between the stand-by state and a full-illumination state in which a full-illumination current producing a full-illumination arc discharge state controllably flows through the discharge lamp.

2. A circuit as set forth in claim 1 wherein the start detecting means comprises means for detecting starting of an engine by detecting an output of an alternator of a vehicle.

3. A circuit as set forth in claim 2 comprising temperature detecting means for detecting an internal temperature within the discharge lamp, wherein the discharge control means switches the current control means from the stand-by state to the full-illumination state in response to the temperature detecting means when the internal temperature of the discharge lamp reaches a predetermined value.

4. A circuit as set forth in claim 3 wherein the discharge control means comprises means for rapidly switching the current control means from the full-illumination state to the stand-by state in response to the temperature detecting means when the internal temperature of the discharge lamp is below a predetermined value.

5. A circuit as set forth in claim 4 wherein the temperature detecting means comprises means for detecting a current flow through the discharge lamp indicative of the internal temperature of the discharge lamp.

6. A circuit as set forth in claim 1 comprising a relay connected to the current control means and the discharge control means for connecting and disconnecting a power supply and the current control means and the discharge control means, the realy being operable in response to at least one of an illumination command signal and an engine start detection signal.

7. A circuit as set forth in claim 1 wherein the current control means controls a current flowing through a main metal vapor discharge lamp and a dimmer metal vapor discharge lamp and the discharge control switches the current control means between a main illumination state in which a full-illumination current controllably flows through the main discharge lamp and a stand-by current controllably flows through the dimmer discharge lamp, and a dimmer illumination state in which a full-illumination current controllably flows through the dimmer discharge lamp and a stand-by current controllably flows through the main discharge lamp, the discharge control means controlling the rate at which the current control means changes the current flowing through one of the main and dimmer discharge lamps from the full-illumination current to the stand-by current in response to the temperature in the other lamp of the main and dimmer discharge lamps being switched from a flow of the stand-by current to a flow of the full-illumination current.

8. A control circuit for a metal vapor discharge lamp comprising:
a DC/AC converter for supplying current to a metal vapor discharge lamp;
temperature sensing means for sensing internal temperature of the discharge lamp; and
frequency control means for varying an oscillation frequency of the DC/AC converter between a stand-by frequency at which the DC/AC converter supplies a stand-by current and a full-illumination frequency at which the DC/AC converter supplies a full-illumination current, the frequency control means responding to the temperature sensing means and controlling the stand-by frequency according to the internal temperture in the discharge lamp to maintain a predetermined internal temperature in the discharge lamp at which a full-illumination state can be rapidly achieved.

9. A circuit as set forth in claim 8 comprising start detecting means for detecting starting of a power supply, the frequency control means setting the oscillation frequency to the stand-by frequency when the start detecting means detects starting.

10. A circuit as set forth in claim 8 comprising an illumination switch connected to the frequency control means for connecting the frequency control means to a power supply.

11. A circuit as set forth in claim 9 wherein the start detecting means comprises means for detecting starting of a vehicle alternator.

12. A circuit as set forth in claim 11 wherein the frequency control means comprises an L-C resonance circuit connected to the discharge lamp and including a first capacitor, a coupling capacitor connected between the DC/AC converter and the L-C resonance circuit, a second capacitor connected to the first capacitor of the L-C resonance circuit for detecting a voltage across the discharge lamp, and a resistor connected to the discharge lamp for detecting a current having a constant relationship to the internal temperature of the discharge lamp and flowing through the discharge lamp.

13. A circuit as set forth in claim 12 wherein the frequency control means changes an oscillation frequency $f_M$ to a frequency Fo at which a spark discharge occurs across the discharge lamp and a complete breakdown of resistance occurs across the discharge lamp.

14. A circuit as set forth in claim 13 wherein the frequency control means changes the oscillation frequency $F_M$ to $F_s$ ($\leqq$Fo) after changing the oscillation frequency to Fo so that the voltage across the discharge lamp is controlled to a relatively high voltage and the arc current detected by the resistor indicates a relatively low internal temperature, thereby warming up the discharge lamp.

15. A control circuit for controlling main and dimmer discharge lamps comprising:

a first DC/AC converter for supplying current to a main discharge lamp and a second DC/AC converter for supplying current to a dimmer discharge lamp, each of the first and second DC/AC converters having an oscillation frequency variable between a stand-by frequency and a full-illumination frequency;

operation detecting means for detecting operation of an illumination switch;

position detecting means for detecting an operating position of a beam change-over switch having a main discharge lamp position and a dimmer discharge lamp position, temperature detecting means comprises means for detecting the internal temperatures of the main discharge lamp and the dimmer discharge lamp; and frequency control means for controlling the oscillation frequencies of the first and second DC/AC converters between the stand-by frequency and the full-illumination frequency according to the internal temperatures of the main discharge lamp and the dimmer discharge lamp, respectively.

16. A circuit as set forth in claim 15, wherein the temperature detecting means determines whether the internal temperature of each of the discharge lamps has reached a predetermined value by determining whether the current flowing through said resistor indicates a stable current value.

17. A circuit as set forth in claim 14 wherein the frequency control means controls the oscillation frequency $f_M$ to $F_M$ which is lower than the oscillation frequency $F_C$ when the illumination switch is turned on immediately after the start detecting means detects starting of an engine.

18. A circuit as set forth in claim 14 wherein the frequency control means controls the oscillation frequency $f_M$ to $F_M$ when the discharge lamp has been maintained in a stand-by state for more than a prescribed length of time and the illumination switch is turned on.

19. A circuit as set forth in claim 14 comprising a resettable timer for measuring time, means for resetting the timer when the current flowing through the discharge lamps is a stable value $I_C$, and means for determining whether the time indicated by the timer exceeds a predetermined time, the frequency control means controlling the oscillation frequency $F_M$ to $F_S$ which is lower than $F_M$ so that the internal temperature of the discharge lamp exceeds the predetermined value.

20. A circuit as set forth in claim 15 wherein the frequency control means controls the first DC/AC converter to supply a full-illumination current to the main discharge lamp and controls the second DC/AC converter to supply a stand-by current to the dimmer discharge lamp when the position detecting means detects that the changeover switch is in the main discharge lamp position.

21. A circuit as set forth in claim 20 comprising means for controlling when the oscillation frequency of one of the first and second DC/AC converters is switched from a full-illumination frequency to a stand-by frequency while the oscillation frequency of the other of the first and second DC/AC converters is switched from a stand-by frequency to a full-illumination frequency based on the internal temperature of a discharge lamp corresponding to the DC/AC converter being switched from a stand-by frequency to a full-illumination frequency.

22. A circuit as set forth in claim 21 comprising a second timer for setting a time at which one of the main and dimmer discharge lamps is to be switched from a full-illumination state to a stand-by state.

23. A circuit as set forth in claim 22 including and connected to main and dimmer discharge lamps in a pair of head lamps of a vehicle.

24. A method for controlling a metal vapor discharge lamp comprising:

illuminating a metal vapor discharge lamp;

passing a stand-by current through the discharge lamp to produce a warmed-up stand-by state, the stand-by current being smaller than a full-illumination current; and passing a full-illumination current for producing a full illumination state through the discharge lamp after producing the stand-by state.

25. A method for controlling a metal vapor discharge lamp comprising:

detecting an internal temperature of a metal vapor discharge lamp connected to a DC/AC converter having an oscillation frequency controlling an oscillation frequency of the DC/AC converter based on the internal temperature of the discharge lamp to a stand-by frequency producing a stand-by current flowing through the discharge lamp, the stand-by current being smaller than a full-illumination current and having a magnitude which maintains a predetermined internal temperature in the discharge lamp such that the discharge lamp can be rapidly switched from a stand-by state to a full-illumination state.

26. A control method for controlling illumination of metal vapor discharge lamps comprising:

applying a first current having a first full-illumination level to a first metal vapor discharge lamp and a second current having a second stand-by level to a second metal vapor discharge lamp;

sensing an internal temperature of the second lamp;

increasing the second current from the second stand-by level towards a second full-illumination level; and decreasing the first current from the first full-illumination level towards a first stand-by level no earlier than the time when the internal temperature of the second lamp reaches a predetermined level.

27. The method of claim 26 including decreasing the first current after increasing the second current.

28. A control method for a metal vapor discharge lamp comprising:

sensing production of electrical power by an alternator driven by a vehicle engine;

producing an initial discharge in a metal vapor discharge lamp in response to the production of electrical power;

passing a stand-by current through the discharge lamp;

sensing an internal temperature of the discharge lamp and adjusting the stand-by current to maintain a predetermined internal temperature of the discharge lamp sufficient to enable the discharge lamp to be rapidly switched from a stand-by state to a full-illumination state; and passing a full-illumination current through the discharge lamp after passing the stand-by current through the discharge lamp.

* * * * *

UNITED STATES PATENT AND TRADEMARK OFFICE

CERTIFICATE OF CORRECTION

PATENT NO. : 5,191,266

DATED : March 2, 1993

INVENTOR(S) : Futami et al.

It is certified that error appears in the above-identified patent and that said Letters Patent is hereby corrected as shown below:

Claim 6, col. 12, line 3, change "realy" to --relay--.

Signed and Sealed this

Eleventh Day of January, 1994

Attest:

Bruce Lehman

BRUCE LEHMAN

Attesting Officer

*Commissioner of Patents and Trademarks*